June 2, 1931.　　　　　G. WALKER　　　　　1,807,645

SCALE

Filed Sept. 28, 1928

INVENTOR.
George Walker
BY
Snell Dunn & Anderson
ATTORNEYS.

Patented June 2, 1931

1,807,645

UNITED STATES PATENT OFFICE

GEORGE WALKER, OF BROOKLYN, NEW YORK, ASSIGNOR TO THE JACOBS BROS. CO., INC., OF NEW YORK, N. Y., A CORPORATION OF NEW YORK

SCALE

Original application filed February 17, 1926, Serial No. 88,723. Divided and this application filed September 28, 1928. Serial No. 309,052.

This invention relates to a scale of the over- and underweight type and which will embody an economical, simple and rugged construction operating over long periods of time with freedom from mechanical difficulty and with great accuracy.

A further object of the invention is that of constructing a scale in which the parts will quickly be returned to a normal or even balance condition and in which, if the parts are not in such position, this fact will be registered in a manner by means of which the amount of over- or underweight will be efficiently indicated.

Specifically, the subject matter of the present application is a division of the disclosure embodied in prior application for United States Letters Patent to George Walker, Serial No. 88,723 filed February 17, 1926.

Reference is had to the attached sheet of drawings illustrating various practical embodiments of the invention and in which.

Figure 1:
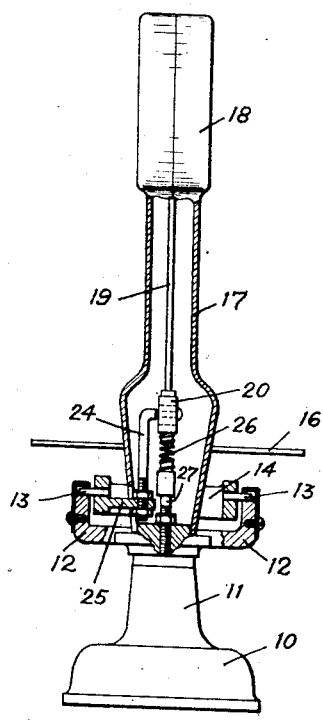
Figure 1 is a partly sectional side view of a scale.

In these several views the numeral 10 indicates a scale base from which a pedestal 11 extends upwardly, this pedestal supporting a yoke 12 mounting bearing elements or surfaces adjacent the ends of its arms and with which pivot pins 13 cooperate. These pins are secured to and extend from a collar portion 14 forming a part of a beam 15, the latter mounting at its ends, in any desirable manner, pans or other suitable receiving elements 16. Secured to the pedestal 11 is the lower end of a casing 17, the upper end of which may terminate in an enlarged portion or head 18 mounting a dial (not shown).

Figures 2, 3:
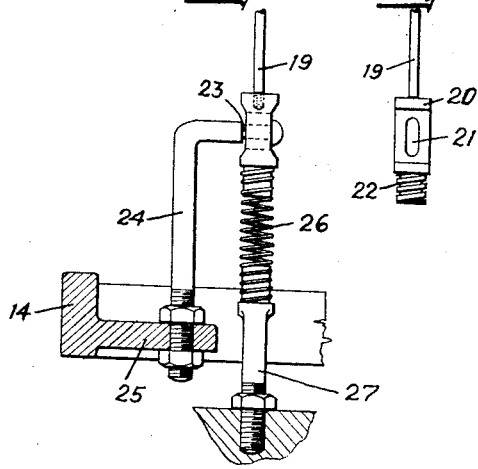
Fig. 2 is an enlarged fragmentary sectional view of certain of the parts as shown in Fig. 1.
Fig. 3 shows a detail of the connecting element employed.

Traversing the graduations on the face of this dial is a pointer (also not shown) which is formed at the upper end of a rod 19. The lower end of this rod may, as illustrated in Figs. 2 and 3, terminate in or be secured to a block 20 formed with a slot 21, this block having a downwardly extending screw-threaded plug 22. Riding within the slot 21 is a pin 23 forming a part of a bracket or bar 24, the lower end of which is secured to an inwardly extending portion 25 forming a part of the collar portion of the beam.

It is obvious that with this construction and conceding that the lower end of the block or rod is properly supported, if the beam is rocked, the pointer at the upper end of the rod will traverse the dial and if the point of support of the rod is above the plane in which the lower end of the bar moves or is supported, the movement of the pointer will be relatively magnified. Thus, the amount of over- and underweight will be registered accurately.

Now, with a view to providing means serving normally to establish and maintain the proper position of the scale beam:—A coil spring 26 may be employed which, if one of its ends is connected to the beam or the structure associated therewith and if its opposite end be anchored, will achieve the result desired. Furthermore, this element may serve as a mounting for the block 20 by simply threading the convolutions of the spring body into the threads of the plug 22 and mounting the lower end of the spring upon the upper end of a post 27 which latter is secured to the pedestal 11.

Figure 4:
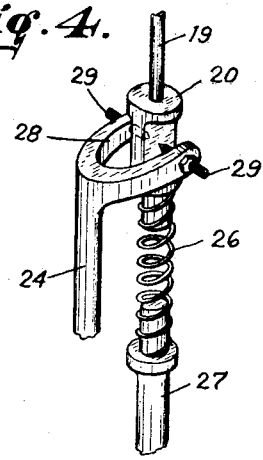
Fig. 4 is a perspective view of a flexion or actuating element having an operative connection slightly different from that shown in the preceding figures.
Figure 5:
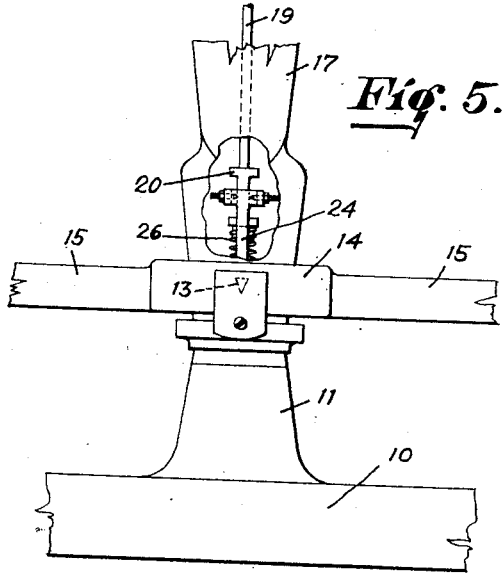
Fig. 5 is a fragmentary front view of a scale embodying the mechanism shown in Fig. 4.

In the form of construction shown in Figs. 4 and 5 the post or bar 24 terminates in a forked end portion 28 mounting inwardly extending screws 29, the reduced end portions of which bear against the flat faces of the block 20.

In both of the constructions illustrated the beam will constantly tend to assume a neutral position incident to the tendency of the coil spring. The amount of weight necessary to effect a given deviation of the beam from such neutral position will be accurately indicated by the registering mechanism and, furthermore, when the beam has its load removed this spring, due to its connection with such beam, will serve to reestablish the proper position of the latter.

From the foregoing it will be appreciated that, among others, the several objects specifically afore referred to are achieved. It will be understood, however, that the spring might be connected with the beam in numerous different manners and that the structure and arrangement of parts generally might be varied in several particulars without departing from the spirit of the invention as defined by the claims.

Having described my invention what I claim as new and desire to secure by Letters Patent is:—

1. A scale including, in combination, a base, a beam rockingly mounted by said base and a coil spring having its opposite ends connected to said base and beam respectively, said spring flexing under movements of said beam to normally maintain the latter in neutral position.

2. A scale including, in combination, a base, a beam rockingly mounted by said base, a coil spring having its opposite ends connected to said base and beam respectively, said spring flexing under movements of said beam to normally maintain the latter in neutral position and means registering the beam position.

3. A scale including, in combination, a base, a beam rockingly mounted by said base, a coil spring having its opposite ends connected to said base and beam respectively, said spring flexing under movements of said beam to normally maintain the latter in neutral position and means having a magnified range of movement and connected to said beam to register the position of the latter.

4. A scale mechanism including a rockingly mounted beam, a coil spring having one of its ends connected with said beam, means for mounting the opposite end of said spring and said spring flexing under movements of said beam and tending normally to maintain the neutral position thereof.

5. A scale mechanism including a rockingly mounted beam, a coil spring having one of its ends connected with said beam, means for mounting the opposite end of said spring and holding the same against movement and said spring flexing under movements of said beam and tending normally to maintain the neutral position thereof.

6. A scale mechanism including a rockingly mounted beam, a coil spring having one of its ends connected with said beam, means for mounting the opposite end of said spring and said spring being positioned to flex and offer increasingly greater resistance to movements of said beam beyond neutral position.

7. A scale mechanism including a rockingly mounted beam, a coil spring having one of its ends connected with said beam, means for mounting the opposite end of said spring and said spring being positioned to flex and offer increasingly greater resistance to movements of said beam beyond neutral position and registering means connected to said mechanism to indicate the position of such beam.

8. A scale including a rockingly mounted beam, a base supporting the same, a coil spring, a registering element connected with one end of said coil spring, means for mounting the opposite end of said spring and means connecting said first named spring end to said beam.

9. A scale including a rockingly mounted beam, a base supporting the same, a coil spring, a registering element connected with one end of said coil spring, means for mounting the opposite end of said spring and means connected to said beam and engaging and having lost motion with respect to the upper end of said spring for flexing the same during movements of said beam beyond neutral position.

10. A scale including a rockingly mounted beam, a coil spring, means for mounting one end of said spring, a post extending from said beam and movably connected with the opposite end of said spring and registering means having one of its elements connected to said latter spring end.

11. A scale including a rockingly mounted beam, a coil spring, means mounting one end of said spring, means connecting the opposite end of said spring to said beam whereby said spring will be flexed during movements of the beam and said connection including a block and a reduced end portion extending into the convolutions of said spring.

12. A scale including a base, a coil spring having one of its ends mounted by said base, a beam rockingly supported upon said base, means connecting said beam to the opposite end of said spring and a pointer extending from such latter spring end whereby when said beam rocks said spring will be flexed and said pointer will traverse a given path of movement.

13. A scale including a base, a beam rockingly mounted thereon, a single coil spring connected to said beam and to be flexed in response to movements of the latter, solely said spring serving to maintain said beam in neutral position and increasingly resisting deflection of said beam to a point beyond such position.

14. A scale including a base, a beam rockingly mounted thereon, a single coil spring connected to said beam and to be flexed in response to movements of the latter, solely said spring serving to maintain said beam in neutral position and increasingly resisting deflection of said beam to a point beyond such position, a registering mechanism for indicating the amount of beam deflection, and means extending from said beam and connected to said registering mechanism to actuate the latter.

15. A scale including, in combination, a base, a beam rockingly mounted thereon, a coil spring mounted by said base, a lever connected to said beam and moving with the latter, means for connecting said lever to said spring, the latter maintaining said beam normally in neutral position and resisting movements of said beam beyond such position, and means connected with said spring to register the amount of deflection of said beam from neutral position.

In testimony whereof I affix my signature.

GEORGE WALKER.